Jan. 29, 1929.                                                1,700,310
H. A. DOUGLAS
CONTACTS FOR SWITCHES FOR LIGHTING SYSTEMS FOR AUTOMOBILE VEHICLES
Filed Jan. 24, 1927                2 Sheets-Sheet 1
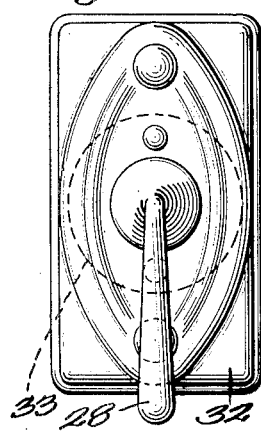
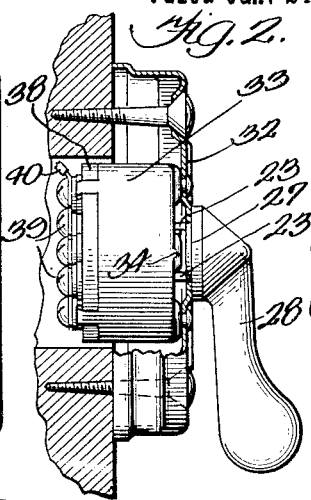
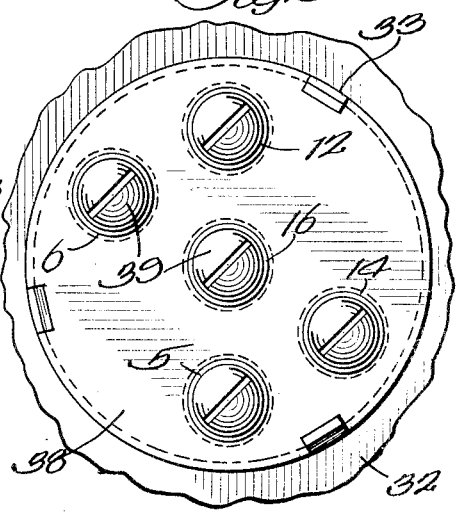
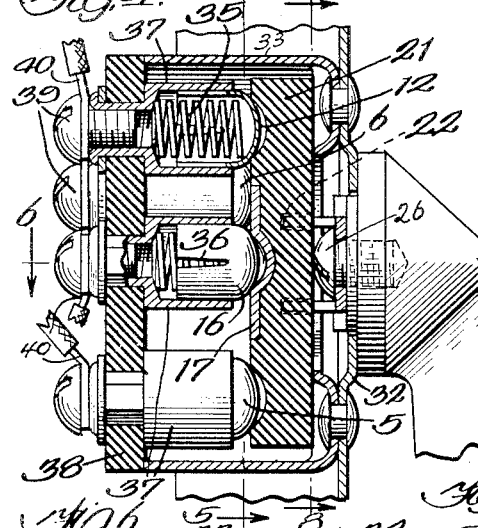
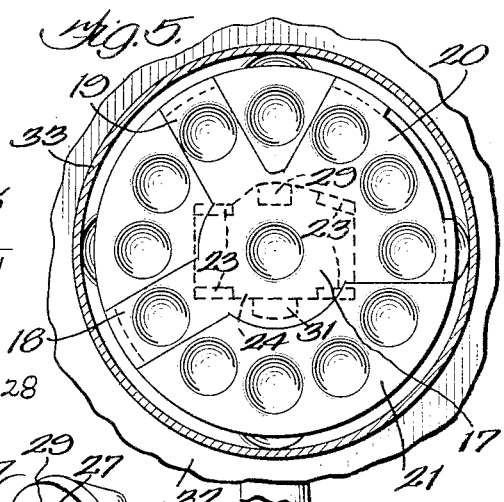
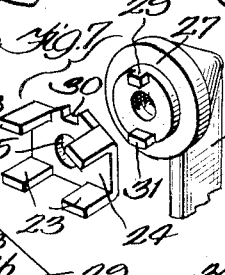
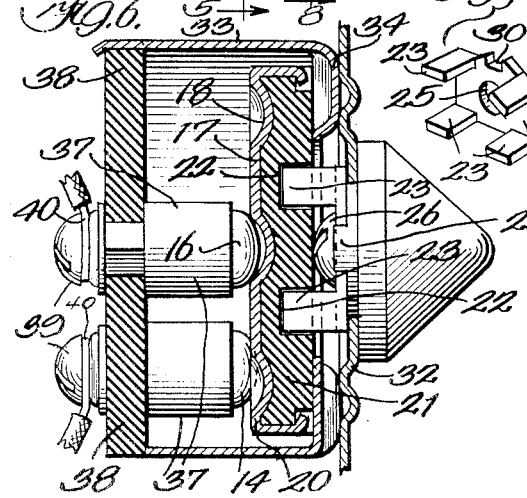
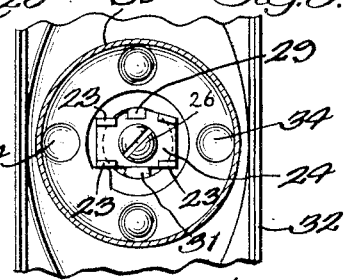
Inventor:
Harry A. Douglas
By G. L. Cragg Atty

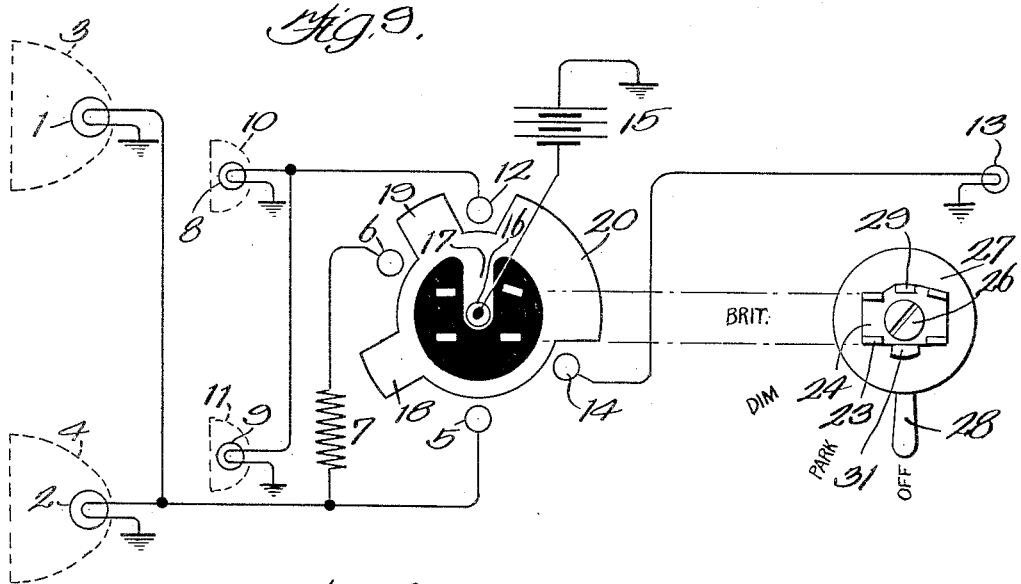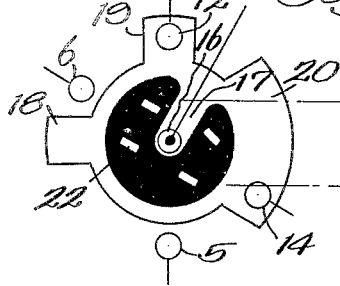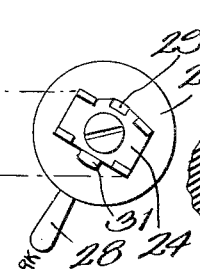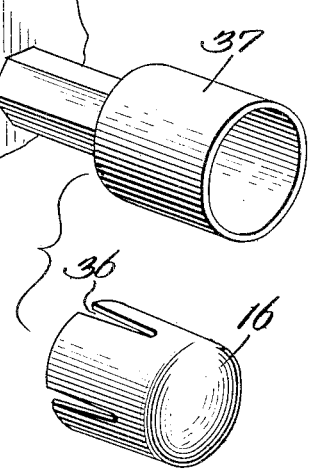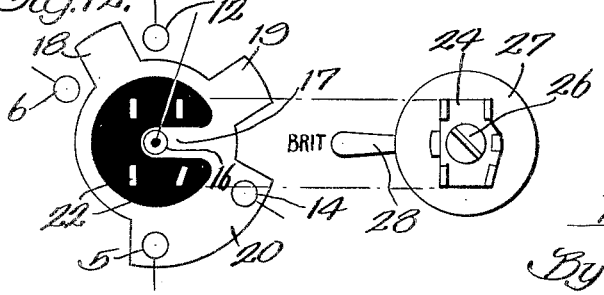

Patented Jan. 29, 1929.

1,700,310

UNITED STATES PATENT OFFICE.

HARRY A. DOUGLAS, OF BRONSON, MICHIGAN.

CONTACTS FOR SWITCHES FOR LIGHTING SYSTEMS FOR AUTOMOBILE VEHICLES.

Application filed January 24, 1927. Serial No. 163,214.

My invention relates to switching mechanism and to lighting systems for automobiles or other automotive vehicles employing such systems.

It is the main object of my invention to provide a lighting system for automotive vehicles having different lighting circuits and unitary switching mechanism in control thereof and so constructed and arranged that no lighting circuit will be opened until another is closed or until all lighting circuits are to be opened whereby the automotive vehicle will always be lighted at some place with no period of darkness when one lighting circuit is to be opened and another closed in place thereof. As I have practiced my invention, the lighting system includes an electric head lamp having two circuits, one enabling a dimmer illumination by the head lamp than the other, an electric parking lamp having a circuit individual thereto, an electric tail lamp having a circuit individual thereto, and unitary switching mechanism constructed and arranged to establish each head lamp circuit alone and to establish either of these circuits before breaking the other, to establish either the parking lamp circuit or one of the head lamp circuits, preferably the dimmer head lamp circuit, before breaking the other, and to maintain the tail lamp circuit closed when the other lamp circuits are opened or closed.

In accordance with another characteristic of the invention, an improved assembly is provided between the contact actuator of a switching mechanism that is enclosed within a casing and an operating handle that is upon the exterior of the casing.

The invention has other characteristics and will be more fully explained in connection with the accompanying drawings in which Fig. 1 is a front elevation of a switch constructed in accordance with one embodiment of the invention; Fig. 2 is a view, partially in section and partially broken away, illustrating the structure of Fig. 1 upon a mounting board; Fig. 3 is a rear view, on a larger scale, of a part of the structure shown in Fig. 2; Fig 4 is a sectional view, on a larger scale, of a part of the switching mechanism shown in Fig. 2, a portion of an operating handle being shown in elevation; Fig. 5 is a sectional view on line 5—5 of Fig. 4; Fig. 6 is a sectional view on line 6—6 of Fig. 4; Fig. 7 is a perspective view of a portion of the handle and a part by which the handle is assembled with the switching mechanism; Fig 8 is a view of a part of the structure viewed in the direction of line 8—8 of Fig. 4; Fig. 9 is a diagrammatic view of the lighting system as it is preferably constructed and arranged and showing all of the lamp circuits open; Figs. 10, 11 and 12 illustrate parts of Fig. 9 in different adjustments, Fig. 10 showing the parking and tail lamp connections established, Fig. 11 showing the dim head lamp and tail lamp connections established, and Fig. 12 illustrating the bright head lamp and tail lamp connections established; and Fig. 13 is a perspective view of some of the parts of the switching mechanism in separated relation.

The lighting system illustrated includes two electric incandescent head lamps 1 and 2 arranged at the foci of parabolic reflectors 3 and 4. Each of said lamps has one terminal grounded and has its other terminal connected by a low resistance path with a contact 5 and also with another contact 6 through a dimming resistance 7. The lighting system illustrated also includes two electric incandescent parking lamps 8 and 9 arranged within concave reflectors 10 and 11. Each of said lamps 8 and 9 has one terminal grounded and has its other terminal connected with a contact 12. There is also an electric incandescent tail lamp 13 which has one terminal grounded and its other terminal connected with the contact 14. A battery 15 has one terminal grounded and its other terminal connected with the contact 16. A metallic contact plate 17 is in constant engagement with the contact 16, this contact constituting a pivot upon which said plate is turned. The contacts 5, 6, 12 and 14, which are preferably metallic, are arranged on a circle that is concentric with the pivotal contact 16. The plate 17 is formed with radially projecting arms 18, 19 and 20 which project beyond the circle of the aforesaid contacts and are suitably spaced apart with relation to each other and are so related to the contacts as to enable said plate to effect the desired control of the circuits as it is turned upon its pivot 16. When this plate is adjusted, as illustrated in Fig. 9, all of the lamp circuits are open. When the plate 17 is adjusted, as illustrated in Figs. 10, 11 and 12, the tail lamp circuit is closed. In Fig. 10, the parking lamp circuits are additionally closed, while the head lamp circuits are opened; in Fig. 11, the dim head lamp circuits are additionally closed while the parking and bright head lamp circuits are opened; and in Fig. 12, the bright head lamp circuits are additionally closed, the parking and dim head lamp circuits being open. When the dim head lamp circuits are to be closed in place of the bright head lamp circuits, the plate 17 is turned counter-clockwise, it being apparent, by an inspection of Figs. 11 and 12, that the dim head lamp circuits are closed before the bright head lamp circuits are opened. By moving the plate 17 further from the position shown in Fig. 11 to the position in Fig. 10, the dim head lamp circuits are opened in addition to the opening of the bright head lamp circuits and the parking lamp circuits are closed, it being apparent by an inspection of Figs. 10 and 11 that the parking lamp circuits are closed before the dim head lamp circuits are opened.

The contact plate 17 is mounted upon the rear face of a disc of insulation 21 that is coaxial with the contact 16. This disc is formed with notches 22 which receive the prongs 23 that project rearwardly from a plate 24. This plate has an opening 25 through which the stem of a screw 26 is passed, the head of this screw clamping the plate 24 against the inner face of the hub 27 that is provided upon a handle 28. A prong 29 upon the hub of the handle is received in a notch 30 in the plate 24. Another prong 31 upon the handle hub engages a side of the plate opposite said notch. The plate is thus forced to turn with the handle. The handle is journalled upon and within the mounting plate 32 forming a part of a switch casing, which casing also has a cylindrical wall 33 and a wall portion 34 integrally formed with the wall 33. The disc 21 is pressed against the inner face of the wall portion 34 by means of the springs 35. These springs desirably also press the contacts 5, 6, 12, 14 and 16 against the insulating disc 21 and against the plate 17 where and when this plate happens to be interposed between the disc and the contacts. The arm 20 of the plate 17 is of a greater arcuate length than the arms 18 and 19 so as to maintain the tail lamp in circuit when any of the other lamps are in circuit, as hitherto described. The contacts 5, 6, 12, 14 and 16 are desirably constructed and arranged as illustrated most clearly in Figs. 4 and 13. These contacts are in the form of cups whose skirts are split, as indicated at 36. The skirts of the contacts are flared before the contacts are assembled within metallic spring barrels 37 that carry them. Said contacts are made of spring metal, the skirts being contracted against their resilience by said spring barrels so that said skirts have intimate and forcible contact with the barrels. The rear ends of the springs are bottomed in the barrels and the rear ends of the barrels are reduced and passed through the closure disc 38 provided at the rear end of the cylindrical casing wall 33. The reduced ends of the spring barrel are hollow and threaded to receive the binding screws 39 which clamp the circuit wires 40 in place.

Changes may be made without departing from the invention.

Having thus described my invention, I claim:

The combination with a spring barrel; of a plunger contact in the form of a cup, whose bottom is the contact proper, formed of resilient metal and whose skirt has sliding engagement with and within said barrel, said skirt being split and of a size requiring its contraction in order that it may be entered within the barrel; and a spring within said barrel and pressing outwardly upon said contact.

In witness whereof, I hereunto subscribe my name.

HARRY A. DOUGLAS.